(No Model.)
D. O. STRIFLER.
CIRCULAR SAWING MACHINE.
No. 244,335. Patented July 12, 1881.
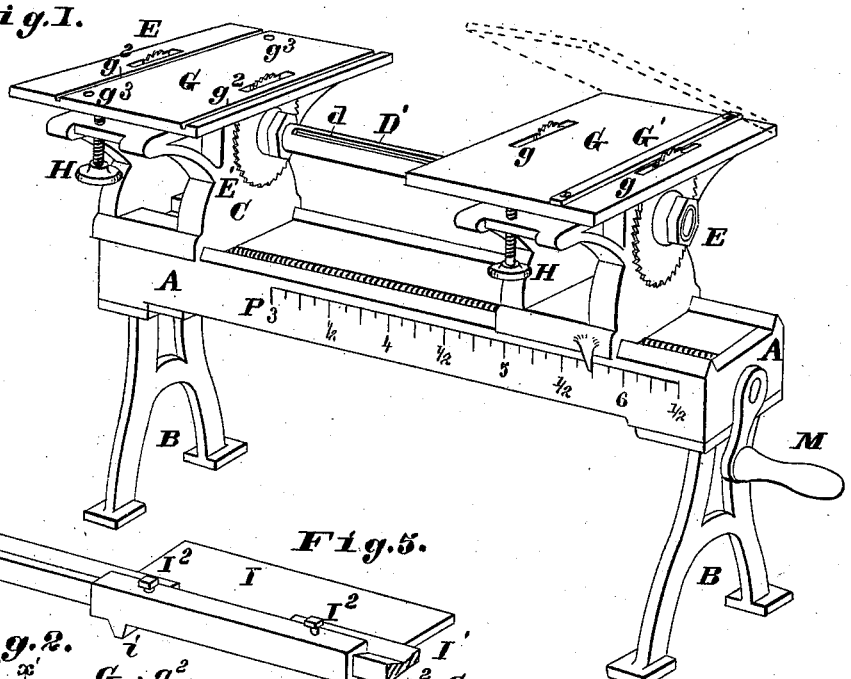
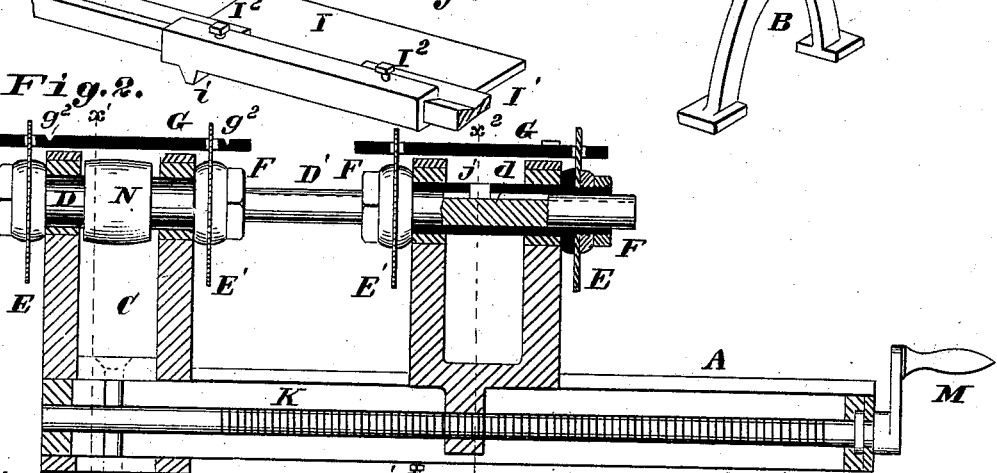
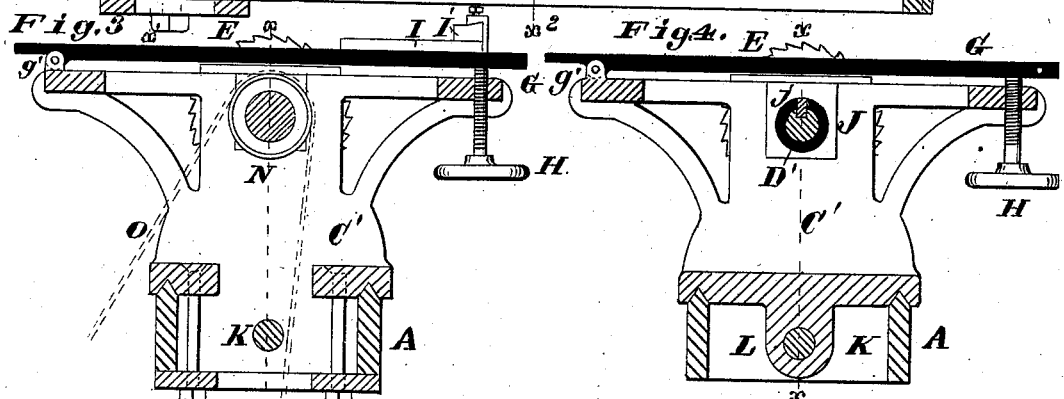
Attest.
Charles Pickles
Geo. H. Knight
Inventor.
Daniel O. Strifler
By Knight Bros.
Attys.

UNITED STATES PATENT OFFICE.

DANIEL O. STRIFLER, OF ST. LOUIS, MISSOURI.

CIRCULAR SAWING MACHINE.

SPECIFICATION forming part of Letters Patent No. 244,335, dated July 12, 1881.

Application filed April 26, 1881. (No model.)

*To all whom it may concern:*

Be it known that I, DANIEL O. STRIFLER, of the city of St. Louis, in the State of Missouri, have invented a certain new and useful Improvement in Sawing-Machines, of which the following is a full, clear, and exact description, reference being had to the accompanying drawings, making part of this specification.

My improvement consists in the combination of a fixed and sliding head supported on a shears, and each carrying a circular saw or saws and a table or rest for the stuff being sawed. The mandrel or arbor of the fixed head is extended axially in a grooved shaft which enters the tubular saw-mandrel of the other head-stock, said mandrel having an interior feather that enters the groove in the shaft, so that the hollow saw-mandrel is actuated by the mandrel of the fixed head-stock, upon which is a drive-pulley. The tubular or hollow mandrel has free endwise movement on the drive-shaft as the movable head-block slides upon the shears. The rear edges of the tables are hinged to the head-blocks, and the front (and free) edges rest on adjusting-screws to regulate the tables vertically.

In the drawings, Figure 1 is a perspective view of the machine, with the carriage on which the stuff is supported removed to show the parts beneath. Fig. 2 is a longitudinal section at $x\ x$, Figs. 3 and 4. Fig. 3 is a transverse vertical section at $x'\ x'$, Fig. 2. Fig. 4 is a similar section at $x^2\ x^2$, Fig. 2. Fig. 5 is a part perspective view of the carriage for the stuff. Figs. 2, 3, 4, and 5 are on a larger scale than Fig. 1.

A is the shears of the machine, supported on legs B.

C is the fixed head-stock, secured to the shears by clamping-bolts $c$. The head-stock C gives journal-bearing to the saw mandrel or arbor D, upon which are secured saws E E'.

The saws are secured upon the arbor by nuts F, or in any suitable manner to allow their ready removal.

The head-stock carries a table, G, which is slotted at $g$ to allow the saws to extend through the table. The table is hinged at the back edge $g'$ to the head-stock, and its front edge rests on the head-stock, or upon the upper end of a screw, H, screwing in the head-stock. By means of this screw the table may be adjusted in height, so that the projection of the saws above the table may be regulated by this means. In the top of the table are guide-grooves $g^2$, to receive a guide-rib on the under side of the carriage I, upon which the stuff to be sawed is supported.

D' is an axial extension of the mandrel D. Said extension passes axially through the tubular arbor or mandrel of the movable head-stock C', that slides on the shears A. The construction of this head-stock and table is in the main similar to that of the fixed head-stock and table before described, and the same parts have like letters; but this table requires no guide-grooves $g^2$, and must be provided with means for movement along the shears and for holding it to its adjustment. This is accomplished by a screw-rod, K, which has bearing in the ends of the shears, and which screws in a fixed nut, L, of the moving head-stock. The bearing of the screw-rod K in the shears is such as to prevent the endwise movement, but to allow it to turn freely.

M is a hand-crank upon the screw-rod K.

The comparative length of the extension D' and the shears is such that when the head-stock C is moved to near the end of the shears the extension-shaft D' is drawn out of the tubular arbor J, so as to allow the removal of the inner saws, E'.

The machine is driven by the following means: N is a belt-pulley on the mandrel D, over which passes a driving-belt, O. By this the mandrel D and the extension drive-shaft D' are turned directly. The drive-shaft D is grooved at $d$ to receive an interior feather, $j$, of the tubular mandrel J, so that the mandrel J is driven by the shaft J', and the construction is such that the shaft slides freely in the tubular mandrel when this head-stock is moved by the screw K.

The carriage I, upon which the stuff or article to be sawed is supported, rests on the two tables G, and has free sliding movement in a direction transverse to the saw-mandrels. The carriage is guided in this movement by a rib, $i$, on the under side of the carriage, that works in one of the grooves $g^2$ in the table of the fixed head-stock.

When long stuff is to be sawed either the inner saws, E', are removed, so as to leave only the outer saws, E, or saws E of larger diameter than those E' are used, and the tables are raised sufficiently to lift the stuff above the saws E'. Where long stuff of small sections is sawed it is necessary that the ends should have transverse support. This is done by means of wings I', which slide in the carriage, and by removable slats G', that are secured upon the table, near the saws, by steady-pins in holes $g^3$, or otherwise, the tops of the slats being at a level with the top of the carriage upon which the stuff is laid. The extension-wings I' are held by set-screws $I^2$.

It will be seen that by means of this machine stuff can be sawed of any length up to a certain limit, and that either one or both ends may be sawed at one operation.

To indicate the distance between the saws E, I make a scale, P, upon the front of the shears, and fix a pointer, Q, upon the moving head-stocks.

I claim—

1. The combination of the fixed saw head-stock C and movable saw head-stock C', shears A, and adjusting-screw K, screwing into the head-stock and having the described bearing in the shears, or vice versa.

2. The combination, with the fixed head-stock and movable head-stock, of a saw-mandrel in one of the head-stocks, with an extension entering an axial cavity of the saw-mandrel of the other head-stock, to communicate motion from one mandrel to the other.

3. The combination of saw-supporting head-stocks C C', mandrel D, with extension D', tubular mandrel J, with feather or stud fitting groove $d$ of the extension-shaft D', and adjusting-screw K, substantially as set forth.

DANIEL O. STRIFLER.

Witnesses:
SAML. KNIGHT,
CHAS. S. BROWN.